United States Patent
Yamaguchi et al.

(10) Patent No.: US 6,659,435 B2
(45) Date of Patent: Dec. 9, 2003

(54) VIBRATION-PROOF DEVICE

(75) Inventors: Naoki Yamaguchi, Osaka (JP); Yoshitaka Ishimoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 10 days.

(21) Appl. No.: 10/074,211

(22) Filed: Feb. 12, 2002

(65) Prior Publication Data

US 2003/0132560 A1 Jul. 17, 2003

(30) Foreign Application Priority Data

Jan. 16, 2002 (JP) ........................................ 2002-008011

(51) Int. Cl.[7] ............................................... F16F 15/00
(52) U.S. Cl. ................ 267/140.12; 267/293; 267/141.2
(58) Field of Search ........................ 267/140.12, 140.11, 267/293, 140.3, 140.4, 141, 141.6, 141.2, 140.13; 248/562, 636

(56) References Cited

U.S. PATENT DOCUMENTS

| | | | | |
|---|---|---|---|---|
| 5,181,698 A | * | 1/1993 | Fiene et al. | 267/140.12 |
| 5,263,692 A | * | 11/1993 | Ito | 267/140.12 |
| 5,280,885 A | * | 1/1994 | Noguchi | 267/140.12 |
| 5,509,643 A | * | 4/1996 | Carstens et al. | 267/140.12 |
| 6,068,247 A | * | 5/2000 | Rudolph | 267/140.12 |
| 6,419,213 B2 | * | 7/2002 | Murai | 267/140.12 |

FOREIGN PATENT DOCUMENTS

JP    10-38014    2/1998

* cited by examiner

Primary Examiner—Christopher P. Schwartz
Assistant Examiner—Melanie Torres
(74) Attorney, Agent, or Firm—Jordan and Hamburg LLP

(57) ABSTRACT

Vibration-isolating device having a low dynamic spring constant, particularly in a high frequency spectrum of about 150 Hz to 300 Hz, and including an annular liquid chamber defined in a rubber elastomer between an internal cylinder member and an external cylinder member. An annular stirring member is arranged in the chamber projecting from an inner periphery side of the external cylinder member inward toward a chamber wall face on the internal cylinder member side form a clearance therebetween. Upon inputting of vibrations, the dynamic spring constant is lowered by the resonance action due to the fluidization of liquid flowing vertically through the clearance within the chamber.

10 Claims, 7 Drawing Sheets

VIBRATION-PROOF DEVICE

BACKGROUND OF THE INVENTION

1. Field of the Invention

This invention relates to a liquid-filled vibration-proof device used for a body mount or a suspension support of a vehicle.

2. Description of Related Art

As a body mount used for a rear suspension of a vehicle or the like, such as an automotive vehicle, there is known a body mount that has an internal cylinder member connected and fixed to one of a vehicle body and a frame on the suspension side supporting the vehicle body, with its axial center oriented vertically. An external cylinder member is connected and fixed to the other around the internal cylinder member, and a rubber elastomer is arranged between and interconnects the internal and external cylinder members. In the rubber elastomer, there is provided an annular liquid chamber surrounding the internal cylinder member.

Also in a suspension support such as a strut mount, for example, a vibration-proof device as disclosed in JP Patent Publication 10-38014 (1998) A is proposed, wherein an internal cylinder member to be fitted to a top of a strut rod and an external cylinder member to be fitted to the vehicle body side are joined by a rubber elastomer disposed between both and further, the rubber elastomer is provided therein with an annular liquid chamber surrounding the internal cylinder member.

With the above-mentioned vibration-proof devices, like the body mount or suspension support, when a vibration load mainly in the axial direction is input, the vibration is adapted to be suppressed by the effect of lowering in dynamic spring constant by the liquid chamber thereby to obtain a required vibration-proof characteristic.

In either case of the vibration-proof devices mentioned above, for the vibrations in a frequency region lower than 150 Hz, the aforesaid lowering effect in dynamic spring constant by the liquid chamber is obtainable and a required vibration-proof characteristic can be exhibited. Notwithstanding this, for the vibrations in a high frequency spectrum of 150 Hz and upward, in particular, in the vicinity of 150–300 Hz the lowering effect of the dynamic spring constant is small and the vibration-suppressing effect is not sufficiently obtained. Further improvement over the vibration-proof devices of these types is therefore desired.

SUMMARY OF THE INVENTION

In view of the prior art situation above the present invention has been made and is contemplated solving the aforementioned problems by the provision of the vibration-proof device of this kind with a stirring member in the liquid chamber, accordingly.

The invention consists in a vibration-proof device comprising an internal cylinder member, an external cylinder disposed concentrically outwardly of the internal cylinder member, and a rubber elastomer disposed between the internal and the external cylinder members, the rubber elastomer having therein an annular liquid chamber surrounding the internal cylinder member; and the vibration-proof device is characterized in that inside the liquid chamber there is provided an annular stirring member projecting inwardly from an inner periphery side of the external cylinder member toward a chamber wall face on the internal cylinder member side so as to hold a clearance therebetween.

According to the vibration-proof device, the liquid chamber is divided by the stirring member into upper and lower parts, which are in communication through a narrow clearance between the stirring member and the chamber wall face on the internal cylinder member side. As a consequence, upon inputting of a vibration load, in particular, a vibration load in the vertical direction, the liquid in the liquid chamber flows through the narrow clearance upwardly and downwardly. Because of resonance action due to the liquid fluidization, the dynamic spring constant can be lowered in a high frequency spectrum in the vicinity of 150 to 300 Hz, as well and the suppression of vibrations can be effectively achieved. Thus it is possible to exhibit good vibration-proof characteristics in a wide range of frequency spectrum.

Further the abovementioned vibration-proof device may be constructed so that the rubber elastomer comprises a main rubber portion bonded by vulcanization to an outer periphery of the internal cylinder member and a diaphragm bonded by vulcanization to the inner periphery of the external cylinder member; a main outer cylinder bonded by vulcanization to an outer periphery of the main rubber portion is fitted hermetically inside the external cylinder member and at the same time, an inside-of-diaphragm cylinder bonded by vulcanization to an inner periphery of the diaphragm is fitted hermetically to the outer periphery of the internal cylinder member, whereby forming the liquid chamber between the main rubber portion and the diaphragm.

By this structure, the liquid chamber, in which liquid is sealed and which is capable of deforming by input of vibrations, can be provided within the rubber elastomer and its assembling and construction is facilitated.

The stirring member is preferably held and pinched at its outer peripheral margin between one end of the main outer cylinder and a step portion at the inner periphery of the external cylinder member. Because of the construction, upon assembling, the stirring member can be incorporated in place easily and securely by preliminarily setting it on the place of the step portion at the inner periphery of the external cylinder member. Further in case where the step portion at the inner periphery of the external cylinder member is formed on an inner periphery of a rubber layer vulcanization-bonded to the inner periphery of the external cylinder member, it is possible to hold and pinch the stirring member elastically, stably and hermetically and to exhibit its function satisfactorily.

The stirring member may comprise a ring-formed plate made of a rigid body and a rubber portion encrusting an inward marginal portion of the ring-formed plate in the liquid chamber. In the event that the stirring member abuts on the chamber wall face on the internal cylinder member side by the input of vibrations in a direction perpendicular to the axis, it is thereby possible to absorb the shock, thus suppressing the generation of a hitting sound.

Alternatively it is also possible to construct the vibration-proof device of this invention so that the rubber elastomer comprises a main rubber portion bonded by vulcanization to the outer circumference of the internal cylinder member and a diaphragm forming the liquid chamber between both; the external cylinder member has an outside-of-diaphragm cylinder, including a cylinder portion to which the diaphragm is bonded by vulcanization, to be fitted to a vehicle body panel, etc. and a main outer cylinder bonded by vulcanization to an outer periphery of the main rubber portion; the main outer cylinder is fitted hermetically, at its one end, to the inside of the cylinder portion of the outside-of-diaphragm cylinder and at the same time, an inside-ofdiaphragm cylinder bonded by vulcanization to an inner periphery of the diaphragm is fitted hermetically to the outer periphery of the internal cylinder member, whereby forming the liquid chamber between the main rubber portion and the diaphragm.

By this construction, the liquid chamber sealed with liquid and capable of deforming by inputting of vibrations can be provided inside the rubber elastomer and its assembling and construction is also facilitated.

In this vibration-proof device as well, it is preferred that the stirring member be held and pinched at its outer marginal portion between one end of the main outer cylinder and a step portion at the inner periphery of the cylinder portion of the outside-of-diaphragm cylinder. In assembling, it is possible to incorporate easily the stirring member in place by setting it on a place of the step portion at the inner periphery of the external cylinder member. Further in case where the step portion at the inner periphery of the cylinder portion of the outside-of-diaphragm cylinder is formed on an inner periphery of a rubber layer bonded by vulcanization to the inner periphery of the cylinder portion, it is possible to hold and pinch the stirring member elastically, stably and hermetically.

DESCRIPTION OF PREFERRED EMBODIMENTS

Figure 1:
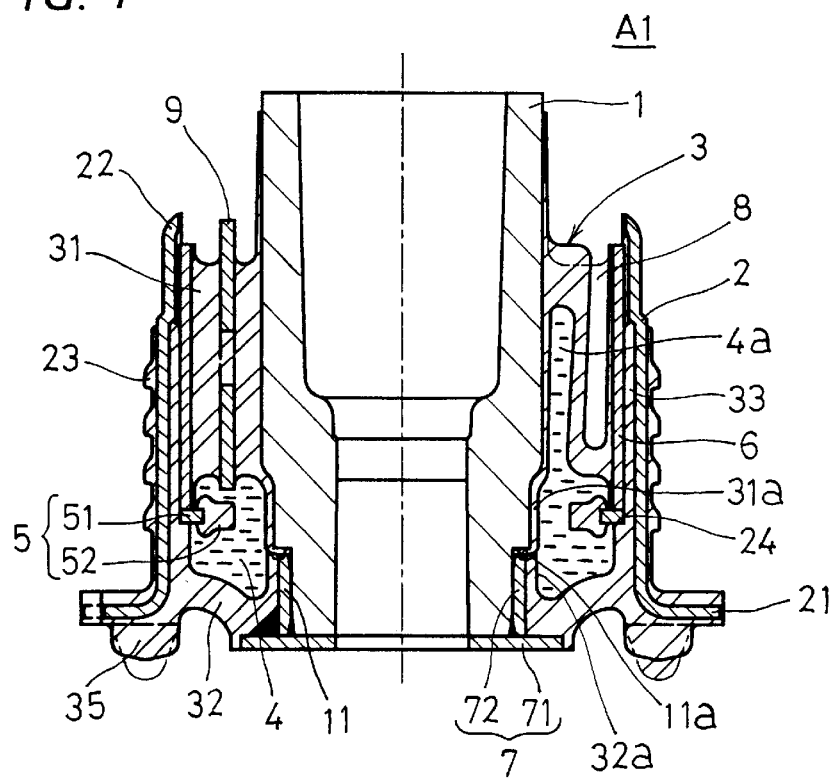
FIG. 1 is a longitudinal sectional view showing a first example of a vibration-proof device of this invention taken along I—I line in FIG. 2.
Figure 2:
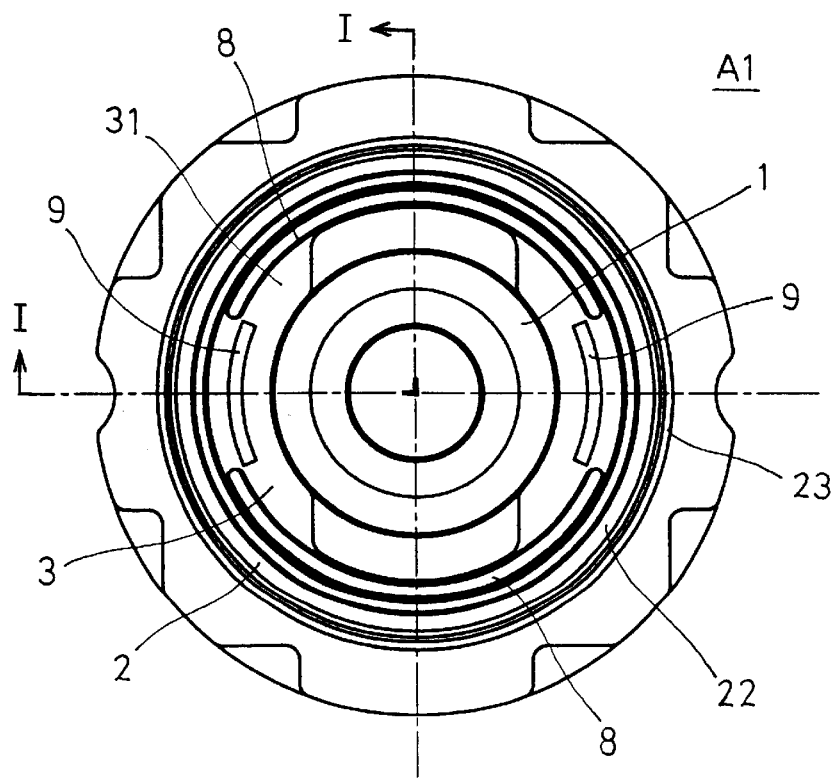
FIG. 2 is a plan view of the vibration-proof device in FIG. 1.
Figure 3:
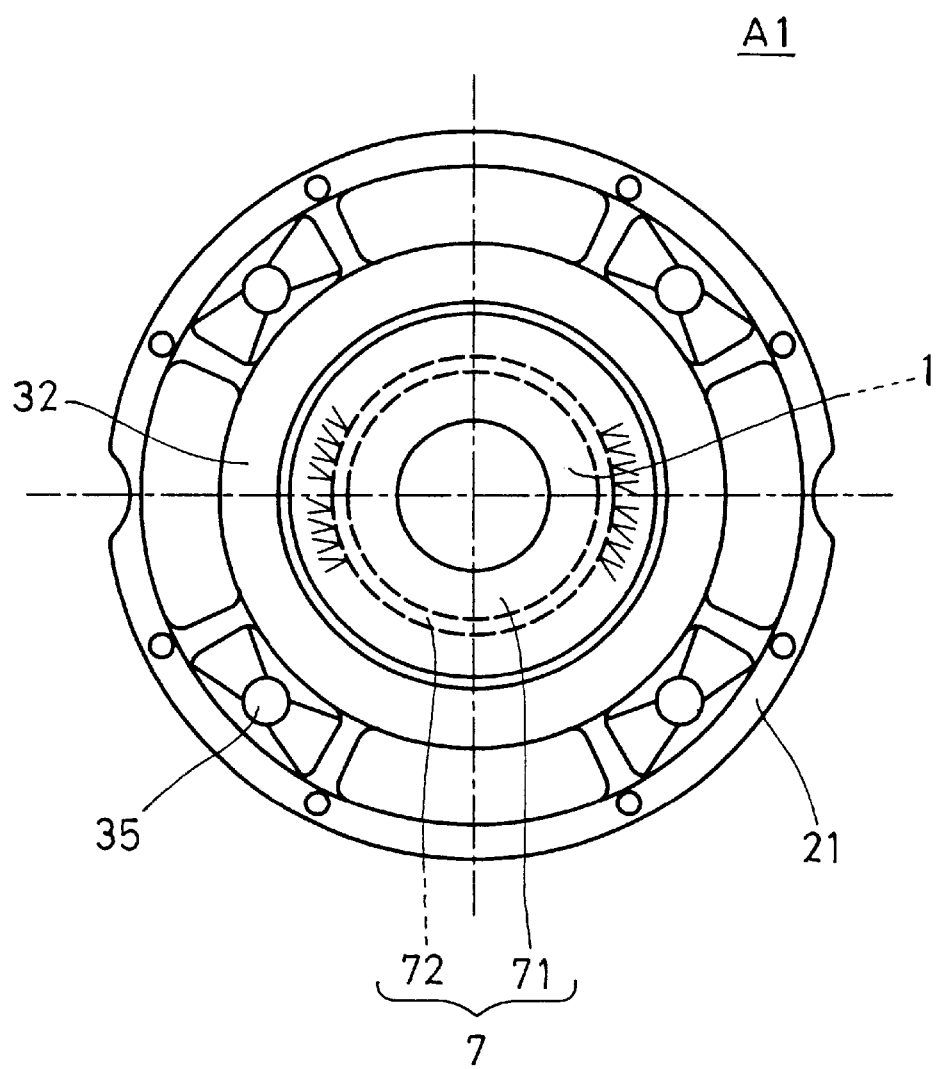
FIG. 3 is a bottom face view of the vibration-proof device in FIG. 1.

The forms of carrying the invention into effect will be hereinafter described on the basis of examples illustrated in the drawings.

FIGS. 1–5 illustrate a first embodiment of this invention, an example of a vibration-proof device A1 mainly used as a body mount.

In the figures the reference numeral 1 is an internal cylinder member to be coupled and fixed to an attachment member on the body side of a vehicle through a shaft member for fastening, such as a bolt or the like. It is of a comparatively thick-walled cylindrical fitting. The reference numeral 2 is an external cylinder member to be fitted and fixed to an attachment member of a frame on the support side such as a suspension, etc. supporting the vehicle body by press-fitting means or the like. And it is composed of a cylindrical fitting having a wall thickness thinner than the internal cylinder member 1 and disposed essentially concentrically with the internal cylinder member 1. These internal and external cylinder members 1, 2 are ordinarily made of metal such as aluminum material or steel.

Between the internal cylinder member 1 and the external cylinder member 2, there is disposed a rubber elastomer 3 in which an annular liquid chamber 4 is formed to surround the internal cylinder member 1. Within the liquid chamber 4, an annular stirring member 5 is provided, as later described, which projects inward from an inner periphery side of the external cylinder member 2 to divide the liquid chamber 4 into upper and lower parts.

Figure 4:
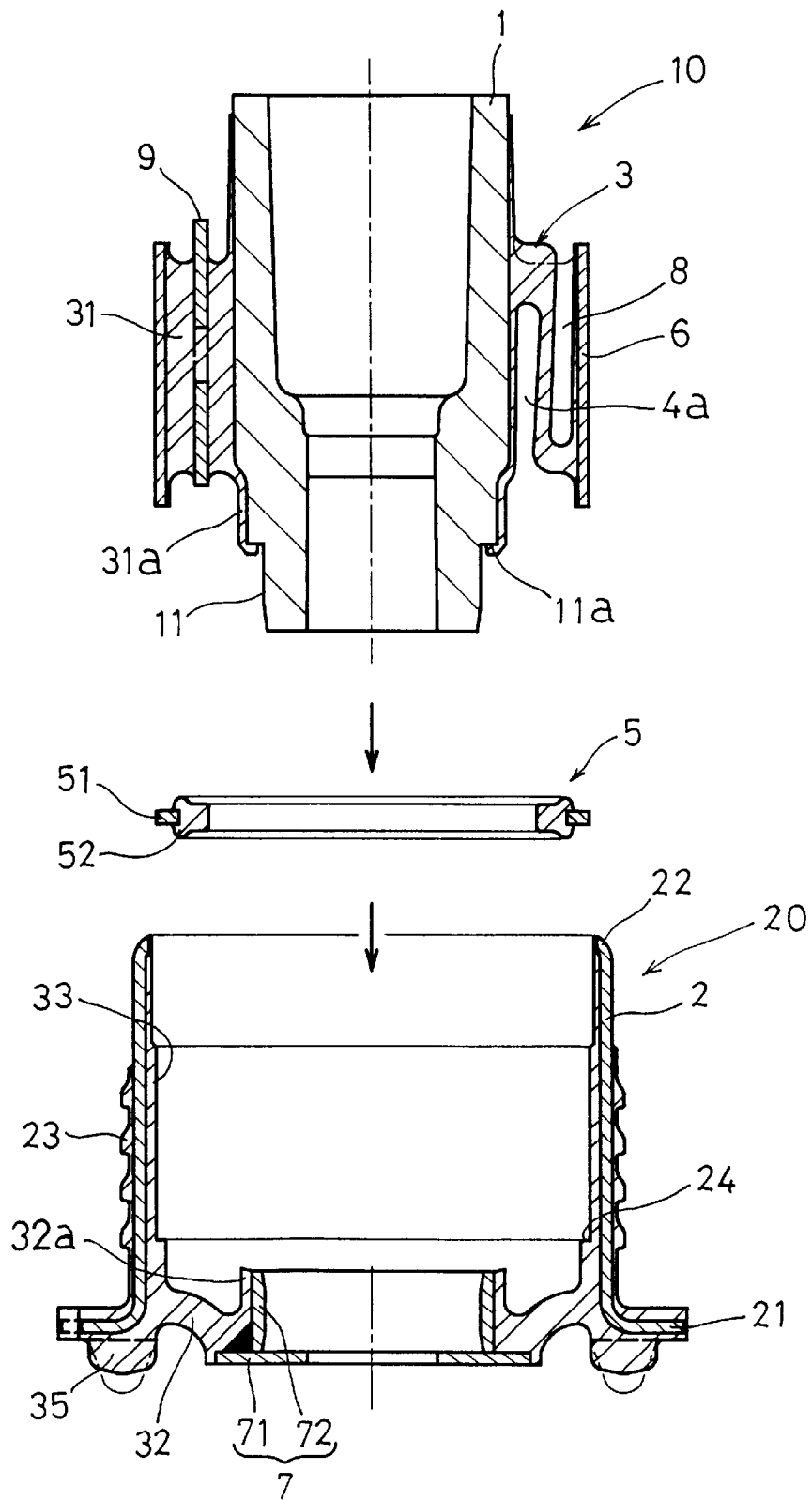
FIG. 4 is a sectional view of the vibration-proof device in FIG. 1 showing its state before assembling.

The rubber elastomer 3 includes a main rubber portion 31 vulcanization-bonded to an outer periphery of the internal cylinder member 1 and a diaphragm 32 vulcanization-bonded to the inner periphery of the external cylinder member 2 to form the liquid chamber 4 between it and the main rubber portion 31. To an outer periphery of the main rubber portion 31 a main outer cylinder 6 is vulcanization-bonded so as to be fitted inside the external cylinder member 2. Stated another way, the internal cylinder member 1, the main outer cylinder 6 and the main rubber portion 31 are integrated by vulcanization molding of the main rubber portion 31. The reference numeral 10 in FIG. 4 represents the resulting molding.

The external cylinder member 2 has a length larger and a diameter somewhat larger than the main outer cylinder 6 and is provided, at its axially one end (lower end), with an outward flange portion 21. To the inner peripheral face of this external cylinder member 2 is bonded a sealing rubber layer 33 of a required thickness by vulcanization, so that the main outer cylinder 6 can be fitted hermetically through the rubber layer 33 to the inner periphery of the external cylinder member 2. On the other hand, at the inner periphery of the external cylinder member 2 on the flange portion 21 side, there is formed the diaphragm 32 extending inwardly of the rubber layer 33. Further, an inside-of-diaphragm cylinder 7 fitted to one terminal portion of the internal cylinder member 1 is bonded by vulcanization to the inner periphery of the diaphragm 32. That is, the external cylinder member 2, the diaphragm 32, the rubber layer 33 and the inside-of-diaphragm cylinder 7 are integrated by vulcanization molding. The reference numeral 20 in FIG. 4 designates the molding body.

The inside-of-diaphragm cylinder 7 is composed of an annular circular plate 71 abutting on the terminal face of the internal cylinder member 1 and a cylindrical portion 72 welded to the circular plate 71 so as to assume a generally reverse T-form in cross section. And the inside-of-diaphragm cylinder 7 is formed so that the cylindrical portion 72 may be fitted to the one terminal portion of the internal cylinder member 1 at its outer periphery by press-fitting means.

In the example as illustrated, the outer periphery at the one terminal portion of the internal cylinder member 1, to which the cylindrical portion 72 is fitted, is offset to form a small-diameter portion 11 slightly smaller in diameter than other portion. Furthermore, a rubber layer 31a, which is rendered integral with the main rubber portion 31 at the outer periphery of the internal cylinder member 1, extends up to a step portion 11a of the small-diameter portion 11, so that the cylindrical portion 72 fitted to the small-diameter portion 11 may elastically abut at the end thereof against the rubber layer 31a thereby maintaining a sealing condition. It is also possible to form a rubber layer 32a integral with the diaphragm 32, which is vulcanization-bonded to the outer peripheral face of the cylindrical portion 72, so as to extend up to the terminal face of the cylindrical portion 72

The molding 10 on the internal cylinder member 1 side and the molding 20 on the external cylinder member 2 side thus formed as separate bodies as shown in FIG. 4 are fabricated in a liquid into the device as shown in FIG. 1, whereby the liquid chamber 4 is formed internally. That is, the main outer cylinder 6 on the molding 10 side is inserted from an opening on the opposite side to the diaphragm 32 to be fitted to the inner periphery of the external cylinder member 2 on the molding 20 side through the rubber layer 33, and concurrently, the inside-of-diaphragm cylinder 7 on the inner periphery of the diaphragm 32 is press fitted into the small-diameter portion 11 of the internal cylinder member 1 on the one end side, whereby the liquid is sealed between the main rubber portion 31 and the diaphragm 32 of the rubber elastomer 3 and the liquid chamber 4 capable of deforming by the input of vibrations is formed.

Usually, the external cylinder member 2 is reduced to some degree in diameter by drawing working in the state that the main outer cylinder 6 is urged therein and concurrently, the other end 22 thereof on the opposite side to the flange portion 21 is crimped inward to be engaged with the end of the main outer cylinder 6. As such, the main outer cylinder 6 is held securely in place.

In the case as illustrated, at the underside of the flange portion 21 there is provided a stopper rubber 35 that when the internal cylinder member 1 undergoes a large upward displacement accompanied by vibrations of the vehicle body, abuts elastically on and is engaged with a stopper plate fixed to the lower end of the internal cylinder member 1. On the outer peripheral face of the external cylinder member 2, a rubber layer 23 for elastically press-fitting into an attachment member of a frame on the support side such as a suspension is provided.

The stirring member 5 is composed of a ring-form plate 51 made of mainly a rigid body such as metal and a rubber portion 52 encrusting an inward margin of the ring-form plate 51 in the liquid chamber 4. The stirring member 5 is held and pinched, at its outer marginal portion, namely at an outer marginal portion of the ring-form plate 51, between the end of the main outer cylinder 6 fitted inside the external cylinder member 2 and the inner periphery of the external cylinder member 2, namely a step portion 24 formed on the inner periphery of the rubber layer 33.

In combining the molding 10 and the molding 20 together, this stirring member 5 can be held and pinched between the step portion 24 and the end of the external cylinder member 2 by preliminarily receiving and setting it on the place of the step portion 24 at the inner periphery of the external cylinder member 2, whereby it is possible to incorporate securely and easily it at a predetermined position. Further because of the formation of the step portion 24 on the inner periphery of the rubber layer 33, the stirring member 5 can be held and pinched elastically, stably and hermetically.

The stirring member 5 may be made of a plate material merely of a rigid body such as metal or synthetic resin. The stirring member 5 is constructed with a view toward absorbing the shock and suppressing the generation of hitting sound in the event that the stirring member 5 abuts on the chamber wall face on the internal cylinder member 1 side by input of vibrations in a direction perpendicular to the axis, it is preferred to provide the stirring member 5 at its inward margin with a rubber piece 52.

In the illustrated embodiment, in the main rubber portion 31 of the rubber elastomer 3, there are formed extension portions 4a of the liquid chamber 4 extended therefrom at positions facing each other in directions perpendicular to the axis and interspacing the internal cylinder member 1 so that each of the portions 4a may be formed in a required width in the circumferential direction, and besides, outside the extension portions 4a void spaces 8, 8 are defined. In this manner, corresponding portions of the main rubber portion 31 are made thin-walled, so that the spring rigidity in the aforesaid directions is made soft. Further, in the main rubber portion 31 at its locations facing each other in the directions perpendicular to the axis orthogonally intersecting the aforesaid perpendicular-to-axis directions, intermediate plates 9, 9 are embedded each in a circumferentially required width, whereby the spring rigidity in the orthogonal directions is heightened. By means of this structure, in the state of use, for example by locating the intermediate plates 9, 9 in a widthwise direction of the vehicle, the spring rigidity in the widthwise direction of the vehicle is adapted to be made higher in comparison with that in the fore-and-aft direction of the vehicle thereby enhancing the driving stability.

Figure 5:
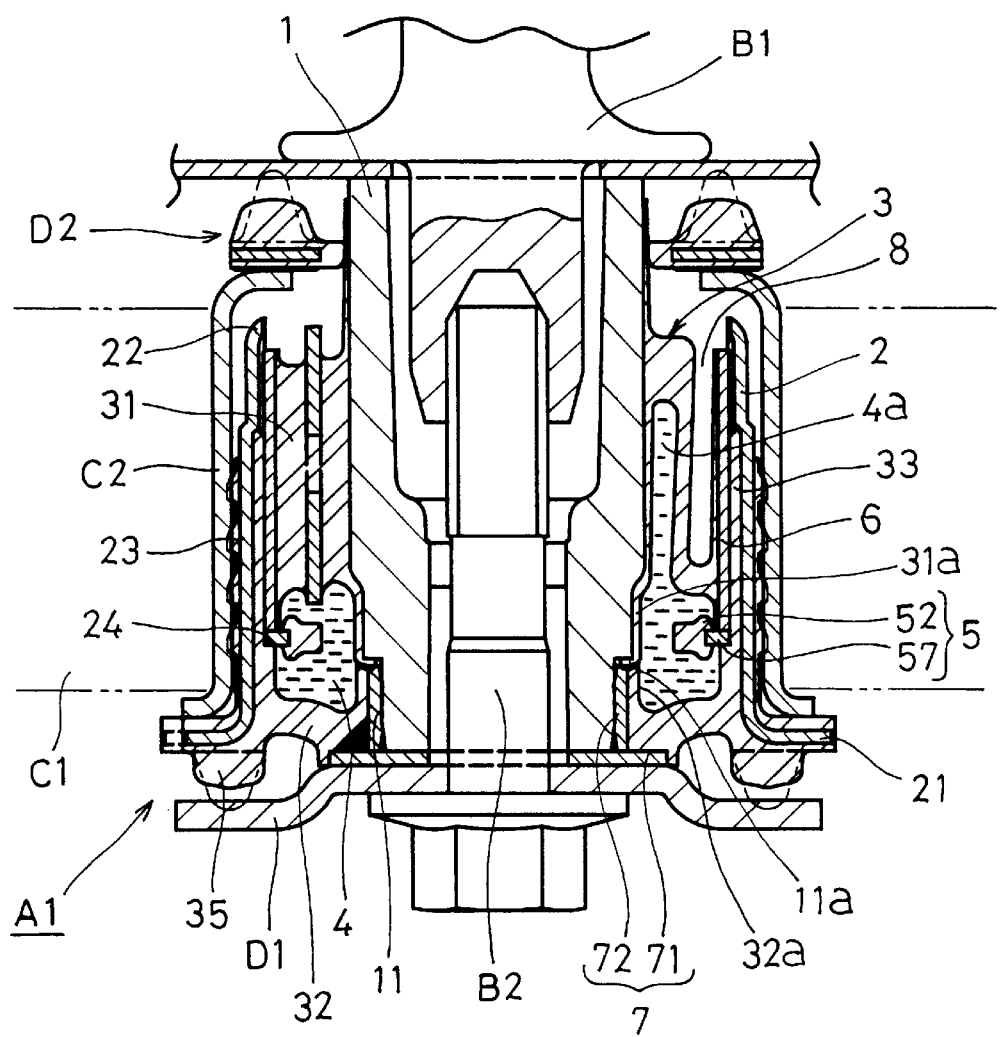
FIG. 5 is a sectional view of the vibration-proof device in FIG. 1 showing a state it is used.
Figure 6:
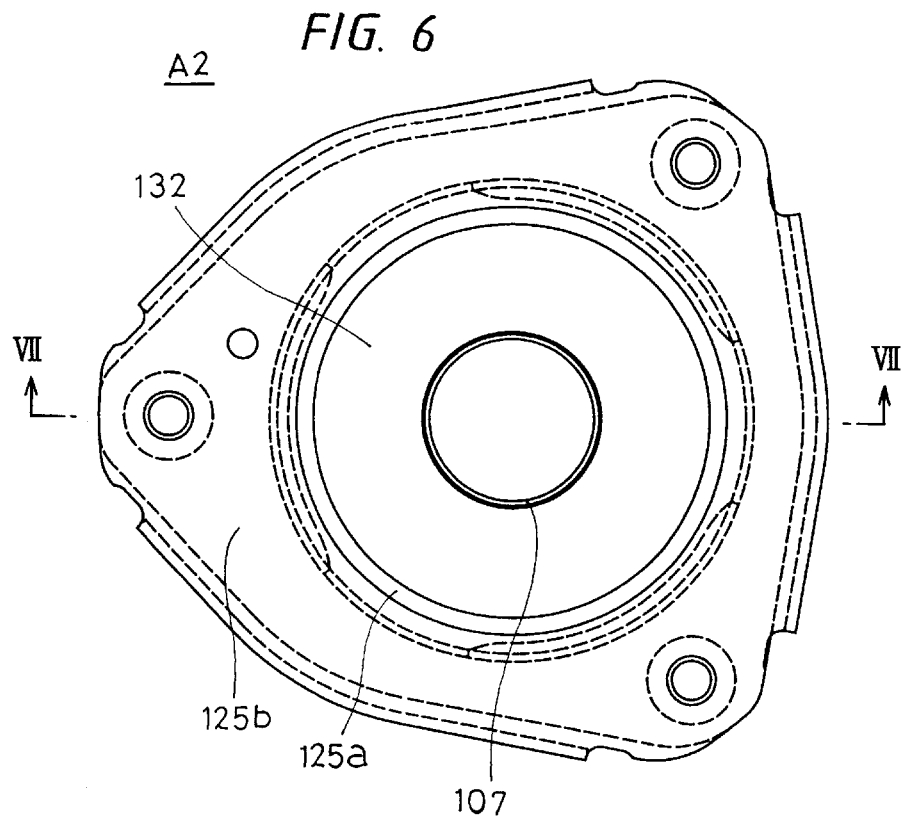
FIG. 6 is a plan view showing a second example of a vibration-proof device of this invention.

The liquid-sealed vibration-proof device A1 as described in the first example above is used for a body mount in a rear suspension of a vehicle such as an automobile. As shown in FIG. 5, the internal cylinder member 1 is coupled to an attachment member B1 on the body side through a shaft member B2 for fastening such as a bolt to be fixed whereas the external cylinder member 2 is press fitted into an attachment hole C2 of an attachment member C1 on the frame side of the suspension through the rubber layer 23 at the outer peripheral face to be fixed.

Here, at the underside of the shaft member B2, a stopper plate D1 is attached so that the stopper rubber 35 located below the flange portion 21 of the external cylinder member 2 may abut on it when the internal cylinder member 1 undergoes an upward large displacement. Further to a part of the internal cylinder member 1 upwards of the attachment member C1, a stopper member D2 formed of a stopper rubber on a ring-form plate is fitted, so that upon large displacement of the body downwardly, the underside of the attachment member B1 on the body side may abut elastically thereon.

In the use of the vibration-proof device A1, the liquid chamber 4 inside the rubber elastomer 3 is divided into upper and lower portions, which are in communication through a small, narrow clearance between the stirring member 5 and a chamber wall face of the internal cylinder member 1. Therefore, when a vibration load is input, particularly when a vibration load in the axial direction is input, the liquid in the liquid chamber 4 flows upwardly and downwardly through the narrow clearance. Owing to the resonance action by this liquid fluidization, it is possible to lower the dynamic spring constant also in a high frequency spectrum in the vicinity of 150 to 300 Hz and to effectively achieve the suppression of vibrations.

FIG. 6 to FIG. 9 show a second example of this invention, another example of a vibration-proof device A2 mainly used as a suspension support such as a strut mount.

Figure 9:
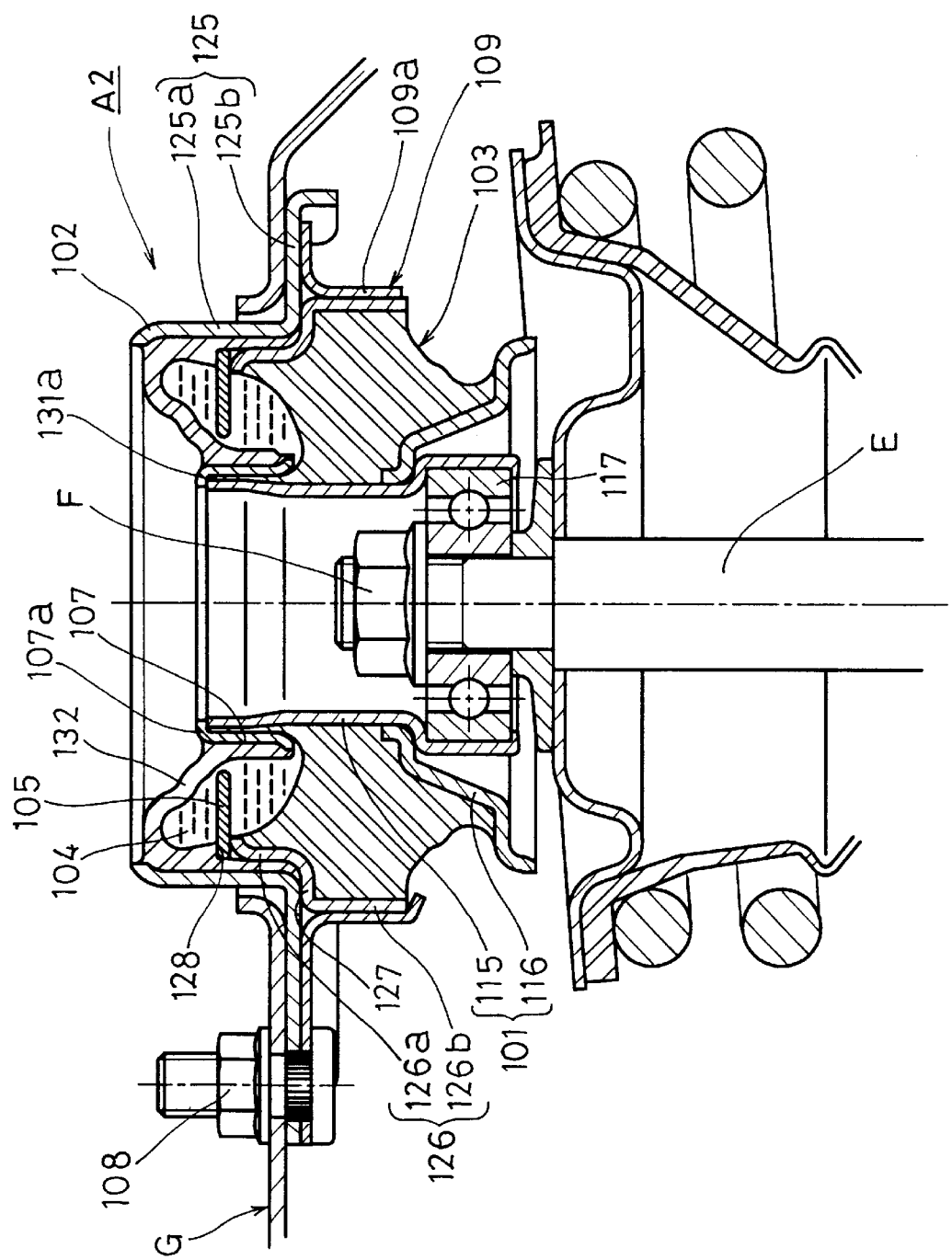
FIG. 9 is a sectional view of the vibration-proof device in FIG. 6 showing a state of use.

The vibration-proof device A2 in this example has, as shown in FIG. 9, an internal cylinder member 101 adapted to be fitted coupled to an upper top of a strut rod E by fastening means F such as a nut or the like, an external cylinder member 102 adapted to be coupled to a member G such as a vehicle body panel by a fastening means such as a bolt or the like, and a rubber elastomer 103 arranged between the internal cylinder member 101 and the external cylinder member 102 to interconnect both. In the rubber elastomer 103, there is defined an annular liquid chamber 104 surrounding the internal cylinder member 101, and in the liquid chamber 104 there is provided an annular stirring member 105 projecting inward from the inner periphery side of the external cylinder member 102 to divide the liquid chamber 104 into upper and lower parts.

The internal cylinder member 101 comprises a circular attachment fitting 115 with which the strut rod is inserted, and a skirt-formed fitting 116 diverging in a tapered manner which surrounds the axially one end, e.g., the lower end of the attachment fitting 115 as illustrated, both being integrated by welding means. At one end of the attachment fitting 115 located inward of the skirt-formed fitting 116, a bearing 117 rotatably supports the strut rod and is fixed by crimping.

The rubber elastomer 103 is composed of a main rubber portion 131 vulcanization-bonded to the outer periphery of the internal cylinder member 101, namely to the outer peripheries of the attachment fitting 115 and the skirt-formed fitting 116, and a diaphragm 132 forming the liquid chamber 104 between it and the main rubber portion. The external cylinder member 102 comprises an outside-of-diaphragm cylinder 125 having a cylinder portion 125a, to an inner periphery of which the diaphragm 132 is vulcanization-bonded, and a flange-like attachment plate portion 125b extending from the one end of the cylinder portion 125a, and a main outer cylinder 126 to which the main rubber portion 131 is vulcanization-bonded.

The outside-of-diaphragm cylinder 125 is adapted to be fixed from the one end of the cylinder portion 125a, at a plurality of places on the attachment plate portion 125b that are circumferentially spaced apart at required intervals, to a vehicle body panel by fastening means such as a bolt, etc.

The main outer cylinder 126 vulcanization-bonded to the outer periphery of the main rubber portion 131 is formed into a small-diameter portion 126a slightly smaller in diameter than the cylinder portion 125a of the outside-of-diaphragm cylinder 125 and a large-diameter portion 126b slightly larger in diameter than the cylinder portion 125a via a step portion 127 at an axially central part. The small-diameter portion 126a on the one end side is provided in a manner being fitted hermetically inside the cylinder portion 125a of the outside-of-diaphragm cylinder 125.

The reference numeral 109 in the figures is a fixation fitting rigidly provided to the attachment plate portion 125b by welding or the like and has a cylinder portion 109a into which the large-diameter portion 126b of the main outer cylinder 126 is received. By crimping the terminal portion of the cylinder portion 109a in the state that the large-diameter portion 126b of the main outer cylinder 126 is received in the cylinder portion 109a, the main outer cylinder 126 is fitted and held to the outside-of-diaphragm cylinder 125. It is also possible to provide the fixation fitting 109 so as to fix simultaneously by fastening means 108 such as the bolt.

To the inner peripheral face of the cylinder portion 125a of the outside-of-diaphragm cylinder 125, a rubber layer 133 of a required thickness is inserted by vulcanization bonding means and the small-diameter portion 126a of the main outer cylinder 126 is provided through the rubber layer 133 so as to be fitted hermetically. At the upper terminal part of the cylindrical portion 125a, the diaphragm 132 extending inwardly of the rubber layer 133 is integrally formed. And to the inner periphery of the diaphragm 132 is vulcanization-bonded an inside-of-diaphragm cylinder 107 that is hermetically fitted, through a rubber layer 131a integral with the main rubber portion 131, to the one end of the internal cylinder member 101. The extremity of the inside-of-diaphragm cylinder 107 is bent inwardly so as to engage with the end of the internal cylinder member 101.

Figure 8:
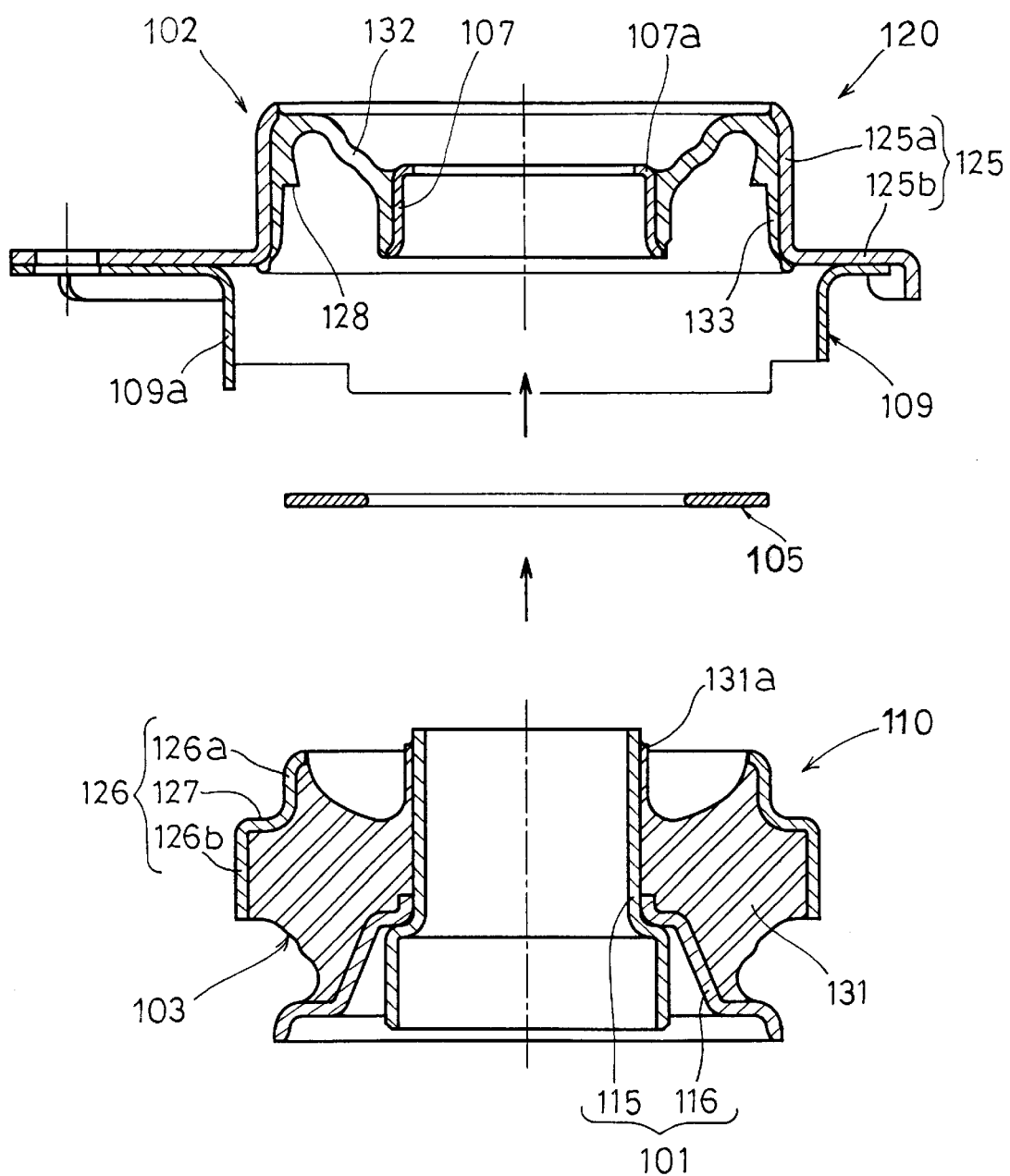
FIG. 8 is a sectional view showing the vibration-proof device in FIG. 6 showing its state before assembling.

The internal cylinder member 101, the main rubber portion 131 and the main outer cylinder 126 are molded integrally as a molding 110 shown in FIG. 8 by vulcanization molding whereas the outside-of-diaphragm cylinder 125 of the external cylinder member 102, the diaphragm 132 and the inside-of-diaphragm cylinder 107 are molded integrally as a molding 120 shown in FIG. 8 by vulcanization molding.

Figure 7:
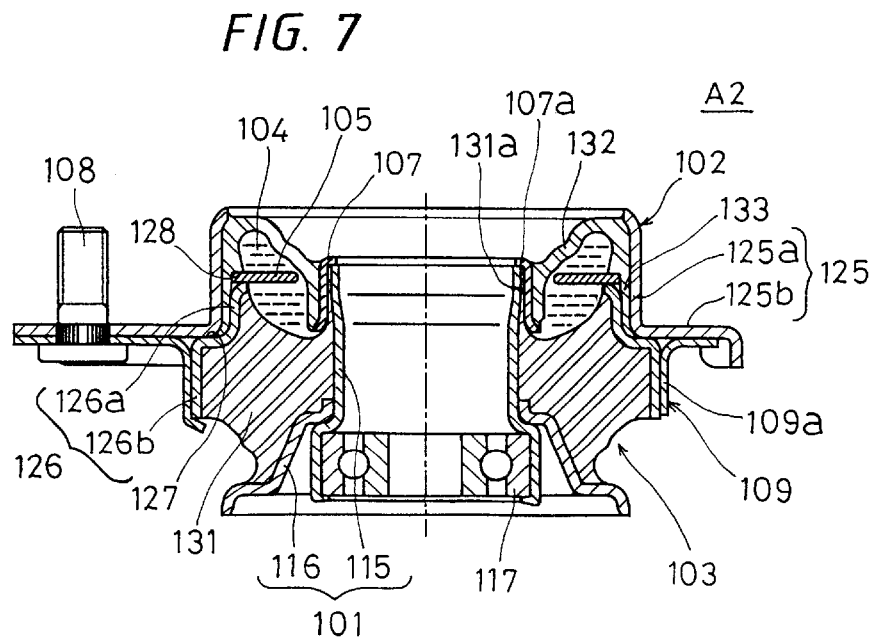
FIG. 7 is a longitudinal sectional view taken along VII—VII line in FIG. 6.

The preceding moldings 110, 120 formed respectively in separate bodies as shown in FIG. 8 are assembled within a liquid to be completed as shown in FIG. 7, whereby the liquid chamber 104 is formed internally. That is, the small-diameter portion 126a of the main outer cylinder 126a on the molding 110 side is inserted from an opening on the opposite side to the diaphragm 132 into part of the external cylinder member 102 on the molding 120 side, namely the inner periphery of the cylinder portion 125a of the outside-of-diaphragm cylinder 125 and fitted thereto through the rubber layer 133. Simultaneously the inside-of-diaphragm cylinder 107 at the inner periphery of the diaphragm 132 is fitted to the one end side of the internal cylinder member 101, which is in turn enlarged, whereby the liquid is sealed between the main rubber portion 131 and the diaphragm 132 of the rubber elastomer 103 and the liquid chamber 104 capable of deforming by input of vibrations is thus formed. In this state of assembling, the large-diameter portion 126b of the main outer cylinder 126 is received in the cylinder portion 109a of the fixation fitting 109, and the cylinder portion 109a is crimped at its extremity to be held in place so as not to be detached. In the example illustrated, the end of the cylinder portion 125a of the outside-of-diaphragm cylinder 125 is positively formed inwardly to avoid the axial detachment.

The stirring member 105 is formed of a ring-shaped plate mainly of rigid body of a plastic material such as nylon. Its outer marginal portion is held and pinched between the end of the small-diameter portion 126a of the main outer cylinder 126, which is fitted inside the cylinder portion 125a of the outside-of-diaphragm cylinder 125, and the step portion 128 formed on the inner periphery of the cylinder portion 125a, namely the inner periphery of the rubber layer 133.

In combining the molding 110 and the molding 120, this stirring member 105 is preliminarily set and fitted on the place of the step portion 128 on the inner periphery of the cylinder portion 125a of the outside-of-diaphragm cylinder 125 constituting the external cylinder member 102, whereby the stirring member can be held and pinched between the step portion 128 and the end of the main outer cylinder 126, and consequently, can be incorporated in place positively and easily. Because of the step portion 128 being formed on the inner periphery of the rubber layer 133, the stirring member 105 can be further held and pinched elastically, stably and hermetically.

The stirring member 105 may be formed of a rigid body plate made of a single material such as nylon or any other synthetic material, metal, etc., but in order to absorb the shock in the event that the stirring member 105 may abut on the chamber wall face on the internal cylinder member 101 side, the stirring member located in the liquid chamber 104 can also be encrusted at its inward margin with a rubber.

The liquid-sealed vibration-proof device A2 in the second example is used, for example, as a strut mount in a suspension of a vehicle such as an automotive vehicle. As shown in FIG. 9, the internal cylinder member 101 is fitted on the upper end of a strut rod E through a bearing 117 and attached and secured thereto by fastening means F such as a nut. On the other hand, the outside-of-diaphragm cylinder 125 of the external cylinder member 102 is attached and secured to a vehicle body member G such as a vehicle body panel by the fastening element 108 such as a bolt.

In this usage as a strut mount, the liquid chamber 104 in the rubber elastomer 103 is likewise divided into upper and lower portions by the stirring member 105, which are in communication through the small, narrow clearance between the stirring member 105 and the chamber wall face on the internal cylinder member 101 side. As a consequence, upon inputting of a vibration load, in particular that in the axial direction, the liquid within the liquid chamber 104 is fluidized upwardly and downwardly. Owing to the resonance action by this fluidization, it is possible to lower the dynamic spring constant particularly in the vicinity of 150 to 300 Hz and further in a high frequency region up to ca. 400 Hz and suppression of vibrations can be effectively achieved.

What is claimed is:

1. A vibration-proof device comprising:
   an internal cylinder member,
   an external cylinder member concentrically arranged outwardly of the internal cylinder member,
   a rubber elastomer interposed between the internal and external cylinder members, the rubber elastomer including an annular liquid chamber surrounding the internal cylinder member, the rubber elastomer including a main rubber portion bonded by vulcanization to an outer periphery of the internal cylinder member and a diaphragm bonded by vulcanization to an inner periphery of the external cylinder member, the liquid chamber being formed between the main rubber portion and the diaphragm,
   an annular stirring member arranged at least partially inside the liquid chamber and projecting inwardly from an inner periphery side of the external cylinder member toward a chamber wall face on the internal cylinder member side to form a clearance between the inner periphery side of the external cylinder member and the chamber wall face,
   a main outer cylinder bonded by vulcanization to an outer periphery of the main rubber portion of the rubber elastomer and arranged hermetically inside the external cylinder member, and
   an inside-of-diaphragm cylinder bonded by vulcanization to an inner periphery of the diaphragm and arranged hermetically in the outer periphery of the internal cylinder member.

2. The vibration-proof device as set forth in claim 1, wherein the stirring member is held and pinched at an outward marginal portion between one end of the main outer cylinder and a step portion at an inner periphery of the external cylinder member.

3. The vibration-proof device as set forth in claim 2, wherein the step portion at the inner periphery of the external cylinder member is formed on an inner periphery of a rubber layer bonded by vulcanization to the inner periphery of the external cylinder member.

4. The vibration-proof device as set forth in claim 1, wherein the stirring member comprises a ring-formed plate made of a rigid body and a rubber portion encrusting an inward margin of the ring-formed plate.

5. The vibration-proof device as set forth in claim 2, wherein the stirring member comprises a ring-formed plate made of a rigid body and a rubber portion encrusting an inward margin of the ring-formed plate.

6. The vibration-proof device as set forth in claim 3, wherein the stirring member comprises a ring-formed plate made of a rigid body and a rubber portion encrusting an inward margin of the ring-formed plate.

7. A vibration-proof device comprising:
   an internal cylinder member;
   an external cylinder member concentrically arranged outwardly of the internal cylinder member;
   a rubber elastomer interposed between the internal and external cylinder members, the rubber elastomer including an annular liquid chamber surrounding the internal cylinder member, the rubber elastomer comprising a main rubber portion bonded by vulcanization to an outer periphery of the internal cylinder member and a diaphragm, the liquid chamber being formed between the main rubber portion and the diaphragm;
   an annular stirring member arranged at least partially inside the liquid chamber and projecting inwardly from an inner periphery side of the external cylinder member toward a chamber wall face on the internal cylinder member side to form a clearance between the inner periphery side of the external cylinder member and the chamber wall face;
   the external cylinder member including an outside-of-diaphragm cylinder including a cylinder portion to which the diaphragm is bonded by vulcanization and which is adapted to be connected to a vehicle body panel, and a main outer cylinder bonded by vulcanization to an outer periphery of the main rubber portion; the main outer cylinder being arranged hermetically at one end inside the cylinder portion of the outside-of-diaphragm cylinder, and
   an inside-of-diaphragm cylinder bonded by vulcanization to an inner periphery of the diaphragm and connected hermetically to the outer periphery of the internal cylinder member.

8. The vibration-proof device as set forth in claim 7, wherein the stirring member is held and pinched at an outward margin between one end of the main outer cylinder and a step portion on an inner periphery of the cylinder portion of the outside-of-diaphragm cylinder.

9. The vibration-proof device as set forth in claim 8, wherein the step portion on the inner periphery of the cylinder portion of the outside-of-diaphragm cylinder is formed on an inner periphery of a rubber layer bonded by vulcanization to the inner periphery of the cylinder portion.

10. A vibration-proof device comprising:
    an internal cylinder member,
    an external cylinder member concentrically arranged outwardly of the internal cylinder member,
    a rubber elastomer interposed between the internal and external cylinder members, the rubber elastomer including an annular liquid chamber surrounding the internal cylinder member,
    an annular stirring member arranged at least partially inside the liquid chamber and projecting inwardly from an inner periphery side of the external cylinder member toward a chamber wall face on the internal cylinder member side to form a clearance between the inner periphery side of the external cylinder member and the chamber wall face,
    the stirring member comprising a ring-form plate made of a rigid body and a rubber portion encrusting an inward margin of the ring-form plate.

* * * * *